Inventor:
Ansell W. Palmer
by Robert L. Beck
His Attorney ated Jan. 26, 1960

2,922,953
SURGE RELIEF SYSTEM FOR WATTHOUR METER

Ansell W. Palmer, Hampton, N.H., assignor to General Electric Company, a corporation of New York Application March 14, 1958, Serial No. 721,565

5 Claims. (Cl. 324—110)

This invention relates generally to protective arrangements for watthour meters and more particularly to an improved surge current relief system therefor.

Surge current relief systems are intended to protect an associated watthour meter from the damaging effects of high current and voltage which might reach the meter in the event one of the lines feeding the meter is struck by lightning, and such systems have heretofore been embodied as component parts of the well-known detachable watthour meters now extensively used by the utility industry. One form of such systems found to be very successful involved the use of a simple air gap separating the line connection of the meter from a grounded surge current conducting circuit. With insulation levels properly coordinated, any surge currents would spark over such gaps and then flow to ground through the grounded circuit. Such a system is described in an article entitled "Surge Protection in a Modern Watthour Meter," written by F. H. Busch and G. D. Williams, and published in the May 1949 issue of the General Electric Review and upon reference thereto will be seen the structural arrangements utilized in such a surge current relief system.

However, the aforesaid system was devised for a single phase watthour meter wherein the line voltage is customarily on the order of 120 volts and it has been found that a simple surge relief gap will not provide adequate surge protection for metering installations having line voltages in the order of 240 volts.

It is, therefore, a primary object of this invention to provide a new and improved surge relief system for a watthour meter that will effectively protect the meter when the line voltages across the meter are on the order of 240 volts.

It is another object of the invention to provide such a new and improved system as a component part of a detachable watthour meter wherein economy of manufacture, simplicity in design, and compactness of arrangements are realized in an optimum manner.

Briefly in one aspect thereof, the invention provides a built-in grounded surge current circuit arrangement that includes at least two serially arranged air gaps across which surge currents will flow, together with magnetic field producing means proximate to each of the gaps. The magnetic field producing means are arranged to be energized by the surge current and function when energized to establish magnetic fields in the gaps of such direction to force the surge current out of the gaps and interrupt further surge current flow.

The invention, together with its objects and advantages, will be best understood upon reference to the following detailed description thereof, especially when taken in conjunction with the single sheet of drawings annexed hereto, in which.

Figures 1, 2, 3:
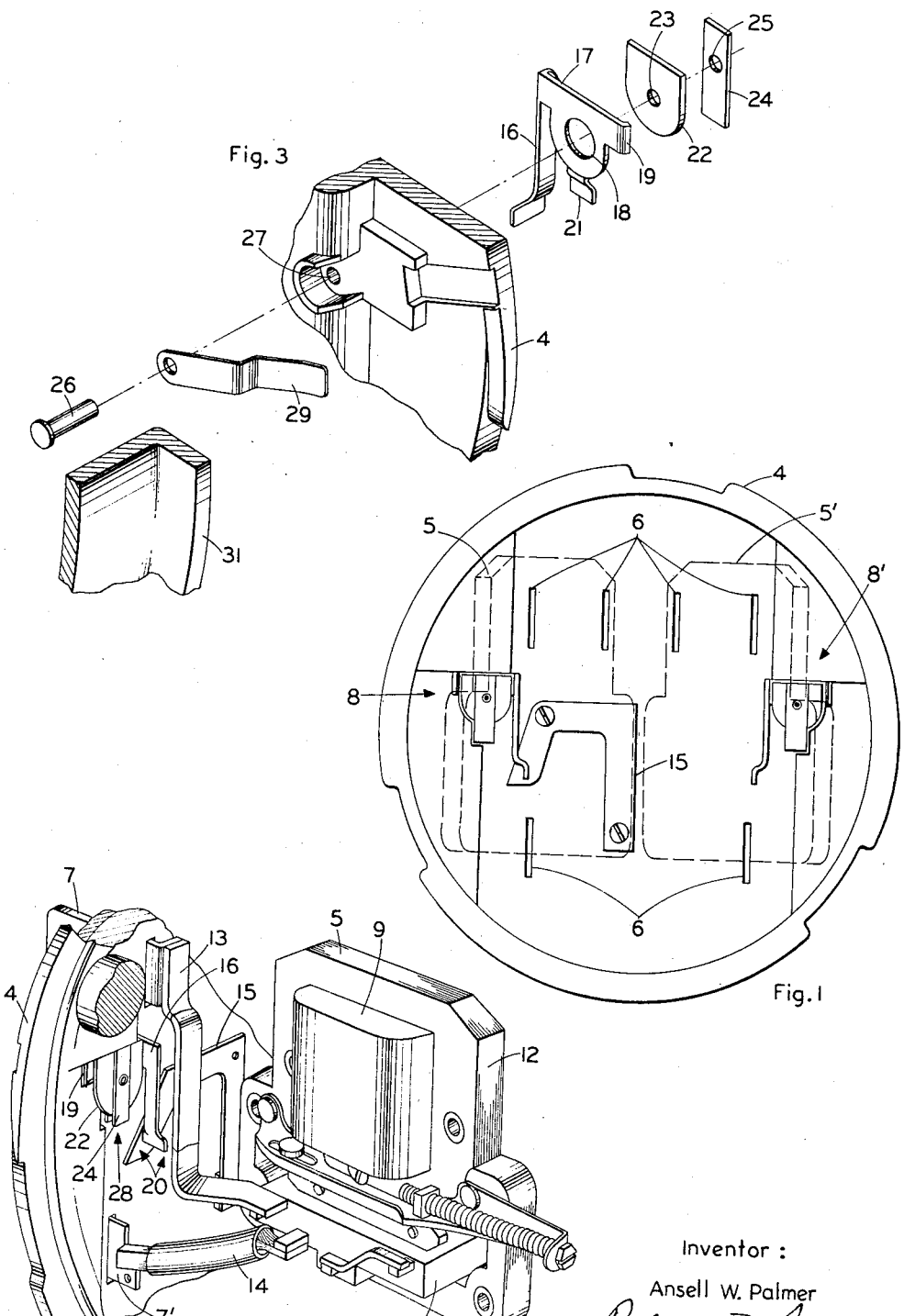
Figure 1 is a plan diagrammatic view of the base of a detachable self-contained watthour meter showing a plurality of surge relief systems constructed in accordance with the teachings of this invention, the cover of the meter being removed and a pair of meter elements being shown only in outline form for the purpose of orienting the surge relief systems relative thereto.
Figure 2 is a perspective view of a portion of the base shown in Figure 1, showing somewhat diagrammatically an associated meter element including its line and load conductors.
Figure 3 is an exploded perspective view of the surge relief system.

Referring now to the drawings, it is to be noted that the invention has been shown as a part of a multi-element polyphase watthour meter, for it is in such meters that the line voltages are customarily in the order of 240 volts. Such a meter may be the so-called "V-type" wherein a pair of meter elements are arranged in the form of a V relative to a single rotating disc, such construction being generally along the lines shown in British Patent No. 462,443. The meter shown in Figure 1 includes a base 4, which may be molded from a suitable plastic insulating material, on which may be mounted by suitable means a pair of identical meter elements 5, 5', both of which are shown in outline in Figure 1. As is well known in the art, the base is provided with a plurality of apertures 6 through which may pass conventional terminal blades (portions of which are shown at 7, 7', in Figure 2) that are used for connection of the meter elements to the circuits to be metered.

A pair of identical surge relief systems are shown in Figure 1 at 8, 8', there being one for each line to which the meter elements 5, 5' are connected, with system 8 also providing protection for the third line of a three-phase, three-wire system.

For a detailed understanding of the surge relief systems, reference will now be had to the showing of system 8 in Figures 2 and 3. In Figure 2, there is shown the conventional watthour meter element 5 which includes the potential winding 9 and the current winding 11 mounted on the unitary core 12, all in a manner well known in the art. Since element 5 is part of a polyphase meter, one of the lines of a three-phase system will be connected to one side of the curernt coil 11 by means of the conducting strap or bus 13, which has its outer end affixed to blade 7, and the other side of the current coil will be connected to the load circuit to be metered by means of the conducting cable 14. A circuit through the meter element is thus provided for one line of a polyphase system, with another line of such system similarly passing through element 5'. The third line is also brought to the meter for connection of the potential leads and to give this line surge current protection, an inverted L-shaped connector 15 is affixed to the meter base having its lower extremity suitably connected to the third line terminal (not shown) of the meter.

Located along side of bus 13 is a first surge current carrying conductor 16 having its lower end spaced from both the bus 13 and the connector 15 to form a first air gap 20 with each. Integral with the upper end of conductor 16 is a substantially semi-circular mounting flange 17 having a centrally located aperture 18, a locating ear 19 and a projecting portion 21, all of which form a second surge current carrying conductor. The base 4 is recessed to provide a seat for flange 17, the recess conforming generally to the peripheral configuration of the flange so that a permanent immobile assembly is obtained. Mounted on flange 17 is a substantially semi-circular insulating member 22, having an aperture 23, on top of which is mounted a third surge current carrying conductor 24, which is also provided with an aperture 25. Apertures 18, 23, and 25 are aligned to receive the shank of a conducting rivet 26 which passes through aperture 27 in base 4 and is upset to lock all of the parts securely in place.

Conductor 24 over-hangs projection 21 to form a second air gap 28, and the rivet 26 also clamps in place a ground strap or terminal 29 which provides connection to a ground circuit through the metallic rim 31 of a conventional meter socket (only a portion of which is shown in Figure 3). As mentioned above, the watthour meter is of the detachable type, conveniently plugging into a meter socket in such a way that the ground terminal 29 is pressed firmly against rim 31, all in a manner well known in the art.

It is to be noted that aperture 18 is large enough to allow for separation between it and the shank of rivet 26, such separation being larger than the width of air gap 28. It is also to be noted that bus 13, gap 20, and conductor 16 forms a partially closed loop as does flange 17 and its projection 21, gap 28, and conductor 24. That is, and assuming that the gaps 20 and 28 were bridged by conducting elements, the bus 13 and conductor 16 form a first U-shaped current path and the flange and its projection form with conductor 24 a second U-shaped current path.

With the above arrangement of parts in mind, and with the widths of the air gaps 20 and 28 correlated to the insulation levels in the various components of the meter, a surge current passing into the meter through bus 13 will jump across gap 20, pass through conductor 16 and its associated parts, jump across gap 28 and then pass on to ground through conductor 24, rivet 26, and ground terminal 29.

As is best seen in Figure 2, a surge current coming to the watthour meter from line terminal 7 will pass downwardly toward the meter through the bus 13. However, when it reaches that part of the bus 13 proximate to surge relief gap 20, it will jump the gap to pass through the grounded surge relief system. After it crosses the gap and enters conductor 16, it will pass upwardly toward the upper end of conductor 16 in a direction reverse to its direction through bus 13. As it travels through both bus 13 and conductor 16 a magnetic field will be produced around each, and in the gap these fields will reinforce one another and be in a direction to force the surge current out of the gap. When the surge current leaves the conductor 16, it will pass downwardly through the flange 17 and projection 21, jump the gap 28 and then pass upwardly in conductor 24 from which, through the conducting rivet 26, it will pass out to the strap 29 after which it will flow to ground. Here again, there is a reversal in the direction of the current as it flows through the second part of the surge relief system and the magnetic fields surrounding each of the conductors will reinforce one another in the gap 28 and be in a direction to force the surge current out of the gap.

Thus, when a high energy surge of approximately 10,000 volts (peak) or more comes in on bus 13, it will pass to ground via the gaps 20 and 28, ionizing both gaps in its passage. However, when the 240-volt, 60 cycle line current attempts to surge through after the ionizing current passes, the first half-cycle of line current will establish magnetic fields at both gaps of sufficient strength and in the proper direction to force such surge currents out of the gaps and stop the surging line current at the end of the first half-cycle.

Surge relief system 8 thus fully protects any surges on the line connected to meter element 5 and in a like manner, system 8' will fully protect the meter from any surges in the line connected to meter element "". As to surges in the third or common line in a three-phase, three-wire system, the connecting link 15 brings such surge currents to relief system 8 where they are dissipated as described above.

It has been demonstrated that with such a surge relief system, full protection is available for at least five successive 25,000-volt impulses on a 240-volt, 60 cycle line powered by a 100 kva. transformer delivering 2500 amperes of current. Moreover, such protection is obtained by a system that is extremely compact and inexpensive to manufacture; one that utilizes minimum space within the meter and derives its magnetic fields by an extremely simple and unique arrangement of parts.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. For use in a self-contained watthour meter which includes a base, a meter element mounted on the base, a plurality of line terminals mounted on the base for connection of the meter element to line and load circuits, and a plurality of line connecting conductors for connecting the meter element to the line terminals; a surge relief system comprising, in combination: a first surge current carrying conductor lying adjacent to and spaced from one of the line connecting conductors, said first conductor having one end offset toward the line connecting conductor and spaced therefrom to form a first surge relief air gap, said first conductor and said line connecting conductor being arranged so that surge currents traveling through the line circuits will pass through the line terminals along the line connecting conductor across the first surge relief air gap and then along the first conductor in a direction opposite to the direction of the current through the line connecting conductor whereby the current traverses a first partially closed loop in its flow to produce a magnetic field in the first surge relief gap in a direction to force the surge current out of the gap to interrupt its flow, a second surge current carrying conductor connected at one end in series with the first conductor, a third surge current carrying conductor lying adjacent to and spaced from said second conductor, the other end of the second conductor and one end of the third conductor being spaced apart to form a second surge relief gap, said second and third conductors being arranged such that surge current as it leaves the first conductor travels along the second conductor across the second surge relief gap and then travels along the third conductor in a direction opposite to the direction of current through the second conductor whereby the current traverses a second partially closed loop in its flow to produce a magnetic field in the second surge relief gap in a direction to force the surge current out of the second surge relief gap to thereby interrupt its flow, and means adapted for connection of the third conductor to ground.

2. The invention defined by claim 1 in which a straight section of the line connecting conductor is adjacent the surge relief system and each of the first, second, and third surge current carrying conductors includes substantially straight sections of conducting material, with the straight sections of the first and second conductors being parallel to and aligned with the straight section of the line connecting conductor and the straight section of the third conductor, respectively, whereby the first conductor, the straight section of the line connecting conductor, and the first surge relief gap form a substantially U-shaped current path and the second and third conductors together with the second relief gap form a substantially U-shaped current path.

3. The invention defined by claim 2 in which the first and second conductors are formed as an integral part which includes a flange portion for mounting this part on the meter base.

4. The invention defined by claim 3 in which the flange portion is substantially semicircular in shape and includes a radially extending projection which together with the flange forms the second conductor, and the third conductor overlies both the flange portion and the projection but is separated from the flange portion by an insulating spacing member supported therebetween.

5. The invention defined by claim 4 in which the means adapted for connection of the third conductor to ground includes a conducting rivet which extends through the watthour meter base and through an oversize aperture in the flange portion and is securely connected to the third conductor to both clamp the surge relief system in place within the watthour meter and at the same time make electrical contact with the third conductor.

References Cited in the file of this patent

UNITED STATES PATENTS

| | | |
|---|---|---|
| 470,721 | Thomson | Mar. 15, 1892 |
| 2,338,109 | Green | Jan. 4, 1944 |
| 2,554,278 | Teszner | May 22, 1951 |

UNITED STATES PATENT OFFICE
CERTIFICATE OF CORRECTION

Patent No. 2,922,953                      January 26, 1960

Ansell W. Palmer

It is hereby certified that error appears in the printed specification of the above numbered patent requiring correction and that the said Letters Patent should read as corrected below.

Column 3, line 66, for "t′" read -- 5′ --.

Signed and sealed this 30th day of August 1960.

(SEAL)
Attest:

ERNEST W. SWIDER                      ROBERT C. WATSON
Attesting Officer                        Commissioner of Patents